United States Patent
Kikuiri et al.

(10) Patent No.: US 7,382,599 B2
(45) Date of Patent: Jun. 3, 2008

(54) CAPACITIVE PRESSURE SENSOR

(75) Inventors: Katsuya Kikuiri, Niigata-ken (JP); Kiyoshi Sato, Niigata-ken (JP); Tetsuya Fukuda, Niigata-ken (JP); Yoshinobu Nakamura, Niigata-ken (JP); Hiroyuki Kobayashi, Niigata-ken (JP)

(73) Assignee: Alps Electric Co., Ltd, Tokyo (JP)

( * ) Notice: Subject to any disclaimer, the term of this patent is extended or adjusted under 35 U.S.C. 154(b) by 0 days.

(21) Appl. No.: 11/553,861

(22) Filed: Oct. 27, 2006

(65) Prior Publication Data

US 2007/0095147 A1 May 3, 2007

(30) Foreign Application Priority Data

Oct. 31, 2005 (JP) ............... 2005-315586

(51) Int. Cl.
*H01G 7/00* (2006.01)
(52) U.S. Cl. .................... 361/283.1; 361/280
(58) Field of Classification Search ........ 361/277–278, 361/280, 283.2, 283.3, 283.4
See application file for complete search history.

(56) References Cited

U.S. PATENT DOCUMENTS

| | | | |
|---|---|---|---|
| 4,875,134 A | 10/1989 | Kuisma | |
| 5,369,544 A * | 11/1994 | Mastrangelo | 361/283.4 |
| 5,585,311 A * | 12/1996 | Ko | 438/53 |
| 5,656,781 A * | 8/1997 | Kankkunen | 73/724 |
| 5,675,086 A * | 10/1997 | Kihara et al. | 73/718 |
| 5,801,313 A * | 9/1998 | Horibata et al. | 73/718 |
| 6,556,417 B2 * | 4/2003 | McIntosh et al. | 361/278 |
| 6,802,222 B2 * | 10/2004 | Ishio et al. | 73/718 |
| 2006/0133006 A1 * | 6/2006 | Suto et al. | 361/283.4 |

FOREIGN PATENT DOCUMENTS

| | | |
|---|---|---|
| JP | 7-49278 | 2/1995 |
| JP | 8-75582 | 3/1996 |
| WO | WO 91/13470 | 9/1991 |

OTHER PUBLICATIONS

Search Report dated Jan. 10, 2007 for corresponding European Patent Application No. 06 02 2314.

* cited by examiner

*Primary Examiner*—Eric Thomas
(74) *Attorney, Agent, or Firm*—Brinks Hofer Gilson & Lione

(57) ABSTRACT

A capacitive pressure sensor is provided. The capacitive pressure sensor includes a glass substrate that has a pair of surfaces facing each other. A first silicon substrate has a fixed electrode passing through the glass substrate to be exposed at one surface and a projection passing through the glass substrate to be exposed at the one surface. A second silicon substrate is bonded to the one surface of the glass substrate and is disposed to face the fixed electrode so as to form a cavity between the second silicon substrate and the fixed electrode.

4 Claims, 5 Drawing Sheets

MEASURED
PRESSURE

CAPACITIVE PRESSURE SENSOR

This patent document claims the benefit of Japanese Patent Application No. 2005-315586 filed on Oct. 31, 2005, which is hereby incorporated by reference.

BACKGROUND

1. Field

The present embodiments relate to a capacitive pressure sensor and a method of manufacturing the same.

2. Related Art

Generally, a capacitive pressure sensor includes a substrate that has a pressure-sensitive diaphragm as a movable electrode and a substrate that has a fixed electrode. The substrates are bonded to each other at a predetermined gap between the pressure-sensitive diaphragm and the fixed electrode. In the capacitive pressure sensor, if pressure is applied to the pressure-sensitive diaphragm, the pressure-sensitive diaphragm is deformed, and the gap between the pressure-sensitive diaphragm and the fixed electrode changes accordingly. The change of the gap causes a change in capacitance between the pressure-sensitive diaphragm and the fixed electrode. Thus, a change in pressure is detected using the change of capacitance.

The above-described capacitive pressure sensor is disclosed in JP-A-8-75582, for example. As shown in FIG. 5, in the capacitive pressure sensor, a glass substrate 2 that has a fixed electrode 3 is disposed on a support substrate 1. A silicon substrate 4 has a diaphragm 4a that is bonded to the glass substrate 2. In the capacitive pressure sensor, a lead electrode 5 for the fixed electrode 3 is patterned on the glass substrate 2, and thus the lead electrode 5 is disposed in a bonded region of the glass substrate 2 and the silicon substrate 4.

However, in this structure, since the lead electrode 5 is located near the diaphragm 4a, parasitic capacitance other than capacitance between the diaphragm 4a and the fixed electrode 3 is large, and thus sensitivity of the capacitive pressure sensor is likely to be degraded. In addition, since the lead electrode 5 is disposed in the bonded region of the glass substrate 2 and the silicon substrate 4, airtightness inside a cavity between the diaphragm 4a and the fixed electrode 3 is reduced.

SUMMARY

In one embodiment, a capacitive pressure sensor includes a glass substrate that has a pair of main surfaces facing each other. A first silicon substrate has a fixed electrode passing through the glass substrate to be exposed at one of the main surfaces and a projection passing through the glass substrate to be exposed at the one main surface. A second silicon substrate is bonded to the one main surface of the glass substrate and is disposed to face the fixed electrode so as to form a cavity between the second silicon substrate and the fixed electrode.

In one embodiment, the fixed electrode and the projection are integrally formed. A separate member is not interposed between the fixed electrode and the projection. In this embodiment, the projection is separated from a pressure-sensitive diaphragm. Accordingly, it is possible to minimize a parasitic capacitance other than capacitance between the pressure-sensitive diaphragm and the fixed electrode. Sensitivity of the capacitive pressure sensor can be improved. In addition, since a lead electrode does not need to be formed in the bonded region of the glass substrate and the second silicon substrate, airtightness inside the cavity can be improved.

In one embodiment, a lead electrode for a fixed electrode is formed on the projection.

In another embodiment, the projection is located outside the fixed electrode on the first silicon substrate. A glass substrate is disposed in a groove that is formed by the fixed electrode and the projection.

In one embodiment, interfaces between the glass substrate and the first and second silicon substrates may have Si—Si bonding or Si—O bonding. In this embodiment, the interface between the glass substrate and the silicon substrate has the Si—Si bonding or Si—O bonding, and thus the silicon and the glass are tightly bonded to each other. Thus, the interface therebetween shows high adhesiveness, and airtightness of the cavity is improved.

In one embodiment, the capacitive pressure sensor includes a glass substrate that has a pair of main surfaces facing each other. A first silicon substrate has a fixed electrode passing through the glass substrate to be exposed at one main surface and a projection passing through the glass substrate to be exposed at the one main surface. A second silicon substrate is bonded to the one main surface of the glass substrate and is disposed to face the fixed electrode so as to form a cavity between the second silicon substrate and the fixed electrode. Therefore, it is possible to improve sensor sensitivity and airtightness in the cavity between the diaphragm and the fixed electrode.

DETAILED DESCRIPTION

Figure 1A:
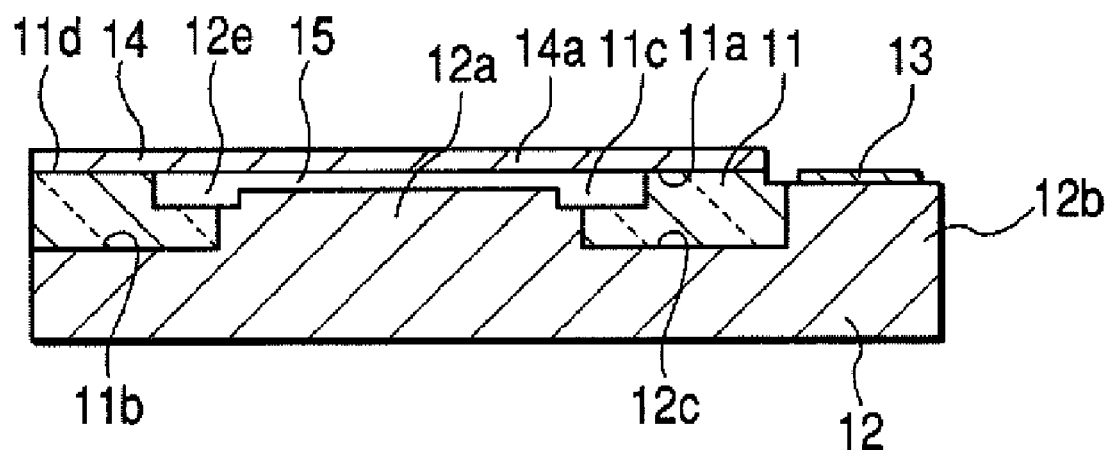
FIGS. 1A and 1B are cross-sectional views showing the schematic construction of a capacitive pressure sensor according to one embodiment.
Figure 1B:
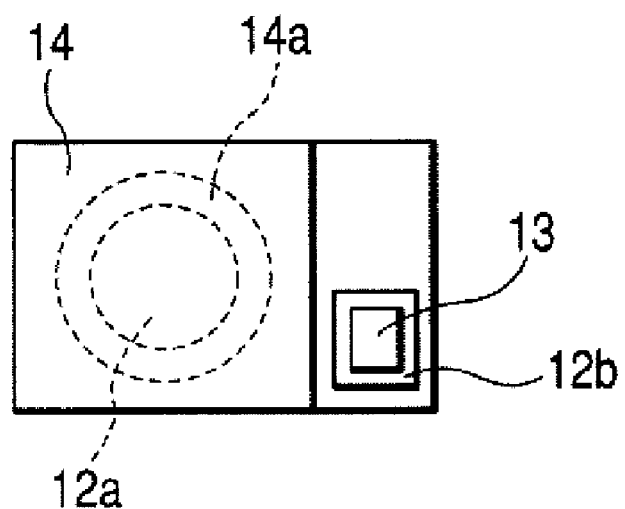

One embodiment will now be described with reference to the accompanying drawings. FIGS. 1A and 1B are views showing a capacitive pressure sensor according to one embodiment. FIG. 1A is a cross-sectional view, and FIG. 1B is a plan view.

Reference numeral 11 indicates a glass substrate. The glass substrate 11 includes a pair of main surfaces 11a and 11b. A first silicon substrate 12 is bonded to the main surface 11b of the glass substrate 11. The first silicon substrate 12 has a fixed electrode 12a and a projection 12b. The fixed electrode 12a and the projection 12b pass through the glass substrate 11 to be exposed at the main surface 11a.

A concave portion 11c is formed at the main surface 11a of the glass substrate 11 so as to form a cavity. The depth of the concave portion 11c is set so as to maintain a predetermined cavity gap in such a range that the exposed fixed electrode 12a inside the cavity is in contact with a pressure-sensitive diaphragm described below. In one embodiment, the width of the concave portion 11c is larger than the fixed electrode 12a.

On the first silicon substrate 12, the projection 12b is positioned outside the fixed electrode 12a, and the glass substrate 11 is disposed inside a groove 12c formed by the fixed electrode 12a and the projection 12b. Specifically, the fixed electrode 12a and the projection 12b are integrally formed, and the glass substrate 11 is disposed in the groove 12c that is disposed between the fixed electrode 12a and the projection 12b. In addition, a lead electrode 13 for the fixed electrode 12a is formed at the top surface of the projection 12b. The lead electrode 13 is electrically connected to an external circuit by a connection device, such as wiring bonding.

A second silicon substrate 14 is bonded to a bonded surface (a region other than the concave portion 11c) 11d of the main surface 11a of the glass substrate 11. The second silicon substrate 14 has a pressure-sensitive diaphragm 14a that serves as a movable electrode for the pressure sensor. A cavity 15 is formed between the concave portion 11c of the glass substrate 11 and the second silicon substrate 14. Capacitance is generated between the pressure-sensitive diaphragm 14a (a movable electrode) and the fixed electrode 12a.

It is preferable that an interface (the bonded surface 11d) between the glass substrate 11 and the second silicon substrate 14 has high adhesiveness. In a case where the second silicon substrate 14 is bonded to the glass substrate 11, the second silicon substrate 14 is mounted on the bonded surface 11d of the glass substrate 11. Adhesiveness between both substrates 11 and 14 can be improved by performing an anodic bonding process. If adhesiveness of the interface between the glass substrate 11 and the second silicon substrate 14 is high, airtightness inside the cavity 15 formed between the pressure-sensitive diaphragm 14a and the concave portion 11c of the glass substrate 11 can be maintained at high level.

A covalent bonding is generated at the interface between the glass substrate 11 and the second silicon substrate 14. The covalent bonding means Si—Si bonding between Si atoms of silicon and Si atoms contained in glass or Si—O bonding. Therefore, as silicon and glass are tightly bonded to each other by Si—Si bonding or Si—O bonding, the interface therebetween shows high adhesiveness. In order to efficiently perform the anodic bonding process, a glass material containing an alkaline metal, such as sodium or the like, (for example, Pyrex (Registered Trademark) glass) is preferably used as a material for the glass substrate 11.

In one embodiment, the interface between the glass substrate 11 and the first silicon substrate 12 undergoes the anodic bonding process. As described below, the interface is formed by inserting the first silicon substrate 12 into the glass substrate 11 when heating. The interface obtained by the above-described method shows high adhesiveness, but adhesiveness can be further improved by performing the anodic bonding process after inserting the first silicon substrate 12 into the glass substrate 11.

In the capacitive pressure sensor having the above-described configuration, predetermined capacitance exists between the pressure-sensitive diaphragm 14a and the fixed electrode 12a passing through the glass substrate 11. If a pressure is applied to the pressure sensor, the pressure-sensitive diaphragm 14a operates according to the pressure. Accordingly, the pressure-sensitive diaphragm 14a moves. At this time, capacitance between the pressure-sensitive diaphragm 14a and the fixed electrode in the glass substrate 11 is changed. Therefore, capacitance can be considered as a parameter, and a change in capacitance indicates a change in pressure.

In one embodiment, the fixed electrode 12a and the projection 12b are integrally formed. For example, the first silicon substrate 12 connects the fixed electrode 12a and the projection 12b, on which the lead electrode 13 is formed. A separate member is not interposed between the fixed electrode 12a and the projection 12b (the lead electrode 13). With this configuration, the projection 12b can be separated from the pressure-sensitive diaphragm 14a. Therefore, it is possible to minimize parasitic capacitance (to 1 pF or less) other than capacitance between the pressure-sensitive diaphragm 14a and the fixed electrode 12a. As a result, sensitivity of the capacitive pressure sensor can be improved. Since the lead electrode 13 does not exist in the bonded region between the glass substrate 11 and the second silicon substrate 14, airtightness inside the cavity 15 can be improved.

A method of manufacturing a capacitive pressure sensor according to the present embodiments will now be described. FIGS. 2A to 2E and FIGS. 3A to 3D are cross-sectional views illustrating a method of manufacturing a capacitive pressure sensor according to the embodiment of the invention.

Figure 2A:
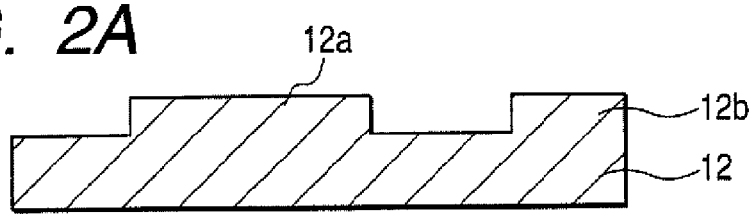
FIGS. 2A to 2E are cross-sectional views illustrating a method of manufacturing the capacitive pressure sensor according to one embodiment.

In one embodiment, a first silicon substrate 12 that has low resistance with a doped impurity is prepared. The impurity may be an n-type impurity or a p-type impurity. Resistivity is set as 0.01 Ω·cm, for example. As shown in FIG. 2A, one main surface of the first silicon substrate 12 is etched to form the fixed electrode 12a and the projection 12b. In this case, a resist film is formed on the first silicon substrate 12, and then is patterned (photolithography) so as to leave the resist film in regions where the fixed electrode 12a and the projection 12b are formed. Silicon is etched with the resist film as a mask, and then the remaining resist film is removed. In such a manner, the fixed electrode 12a and the projection 12b are formed. As described above, since the fixed electrode 12a and the projection 12b are formed in the first silicon substrate 12 as a single body by etching or the like, it is possible to freely set a distance between the fixed electrode 12a and the projection 12b while reducing parasitic capacitance and increasing a degree of freedom for design.

Figure 2B:
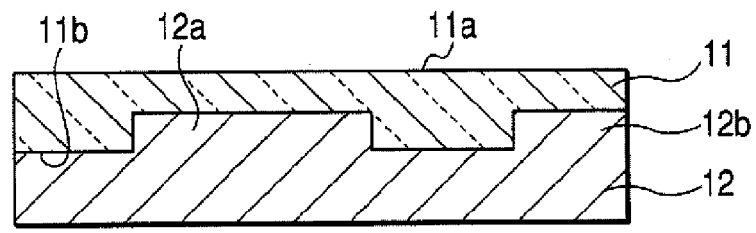

In one embodiment the glass substrate 11 is disposed on the first silicon substrate 12, in which the fixed electrode 12a and the projection 12b are formed. In addition, the first silicon substrate 12 and the glass substrate 11 are heated under a vacuum condition, and the first silicon substrate 12 is pressed against the glass substrate 11 so as to insert the fixed electrode 12a and the projection 12b into the main surface 11b of the glass substrate 11, such that the first silicon substrate 12 is bonded to the glass substrate 11, as shown in FIG. 2B. In this embodiment, the temperature is below a melting point for silicon and, preferably, in such a range that glass is deformable (for example, below a softening point for glass). For example, a heating temperature is about 800° C.

It is preferable to perform the anodic bonding process to improve airtightness of the interface between the fixed electrode 12a and projection 12b of the first silicon substrate 12 and the glass substrate 11. In order to perform the anodic bonding process, electrodes are disposed in the first silicon substrate 12 and the glass substrate 11, respectively, and a voltage in a range of 300 V to 1 kV is applied to the electrodes when the electrodes are heated at a temperate of 400° C. or less. As a result, airtightness of the interface on both sides is further increased, and airtightness of the cavity 12 of the capacitive pressure sensor can be further improved.

Figure 2C:
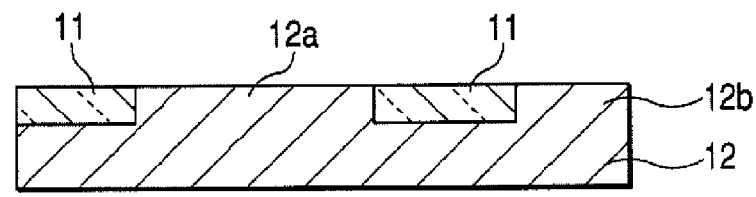
Figure 2D:
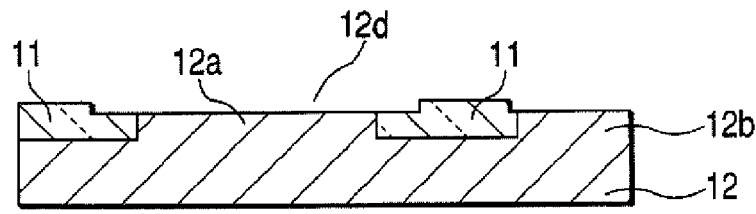
Figure 2E:
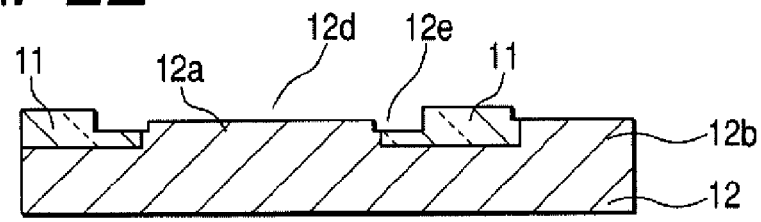

As shown in FIG. 2C, the main surface 11a of the glass substrate 11 is polished to expose the fixed electrode 12a and the projection 12b of the first silicon substrate 12. As shown in FIG. 2D, the glass substrate 11 and the fixed electrode 12a undergo a milling process to form the concave portion 12d for the cavity 15. As shown in FIG. 2E, a recess 12e is formed by milling the outside of the fixed electrode 12a. When the recess 12e is formed in such a manner, the volume of the cavity 15 can be made large, and thus a region for diffusing gas, generated at the time of performing the anodic boding process between the glass substrate and the silicon substrate, can be made large. In one embodiment, the recess 12e is formed, if necessary.

Figure 3A:
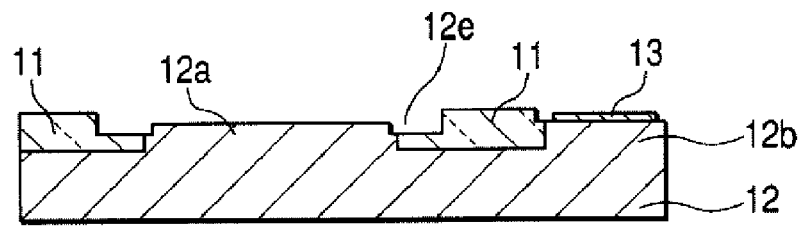
FIGS. 3A to 3D are cross-sectional views illustrating the method of manufacturing the capacitive pressure sensor according to one embodiment.

In one embodiment, as shown in FIG. 3A, the lead electrode 13 is formed on the projection 12b of the first silicon substrate 12. In this case, first, an electrode material are deposited on the projection 12b of the first silicon substrate 12, a resist film is formed thereon, and then the resist film is patterned (photolithography) to leave the resist film in a region where the lead electrode is formed. Then, the electrode material is etched with the resist film as a mask, and the remaining resist film is removed.

Figure 3B:
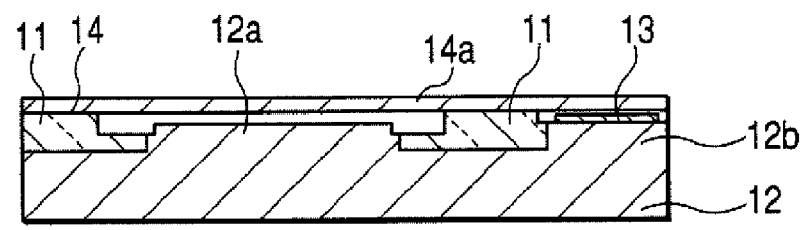

As shown in FIG. 3B, the second silicon substrate 14 that is formed in advance to have a predetermined thickness of several tens of μm by an etching is bonded to the bonded surface 11d of the glass substrate 11, such that the pressure-sensitive diaphragm 14a is positioned so as to be spaced from the fixed electrode 12a at a predetermined gap. In this embodiment, in order to perform the anodic bonding process, a voltage of about 500 V is applied to the second silicon substrate 14 and the glass substrate 11 when they are heated at a temperate of 400° C. or less. As a result, adhesiveness of the interface between the second silicon substrate 14 and the glass substrate 11 is further increased, and airtightness of the cavity 15 can be improved.

Figure 3C:
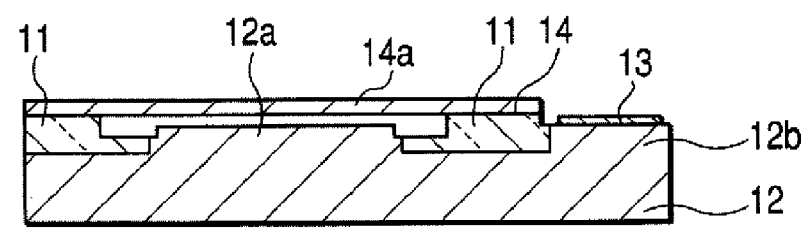
Figure 3D:
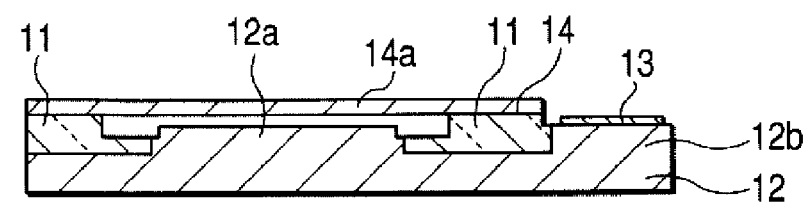

As shown in FIG. 3C, a predetermined portion of the second silicon substrate 13 is removed to expose the lead electrode 13 or a dicing line that is covered with the second silicon substrate 14. In this case, a resist film is formed on the second silicon substrate 14, and the resist film is patterned (photolithography) to leave the resist film on the second silicon substrate 14. Silicon is etched with the resist film as a mask, and then the remaining resist film is removed. With the above-described processes, the capacitive pressure sensor is manufactured. In one embodiment, if necessary, as shown in FIG. 3D, the capacitive pressure sensor is reduced in size by polishing the first silicon substrate 12.

In the resultant capacitive pressure sensor, the fixed electrode 12a is electrically connected to the lead electrode 13 through the projection 12b that is integrally formed with the fixed electrode 12a, and the pressure-sensitive diaphragm 14a is electrically connected to the lead electrode (not shown). Therefore, both lead electrodes can obtain a change signal of capacitance that is detected between the pressure-sensitive diaphragm 14a and the fixed electrode. A measured pressure can be calculated on the basis of the signal.

In the capacitive pressure sensor according to this embodiment, the first silicon substrate 12 connects the fixed electrode 12a and the projection 12b, on which the lead electrode 13 is formed, and the projection 12b is disposed to be separated from the pressure-sensitive diaphragm 14a. Accordingly, it is possible to minimize parasitic capacitance other than capacitance between the pressure-sensitive diaphragm 14a and the fixed electrode 12a. As a result, sensitivity of the capacitive pressure sensor can be improved. Further, since the lead electrode 13 does not exist in the bonded region between the glass substrate 11 and the second silicon substrate 14, airtightness inside the cavity 15 can be improved.

Figure 4:
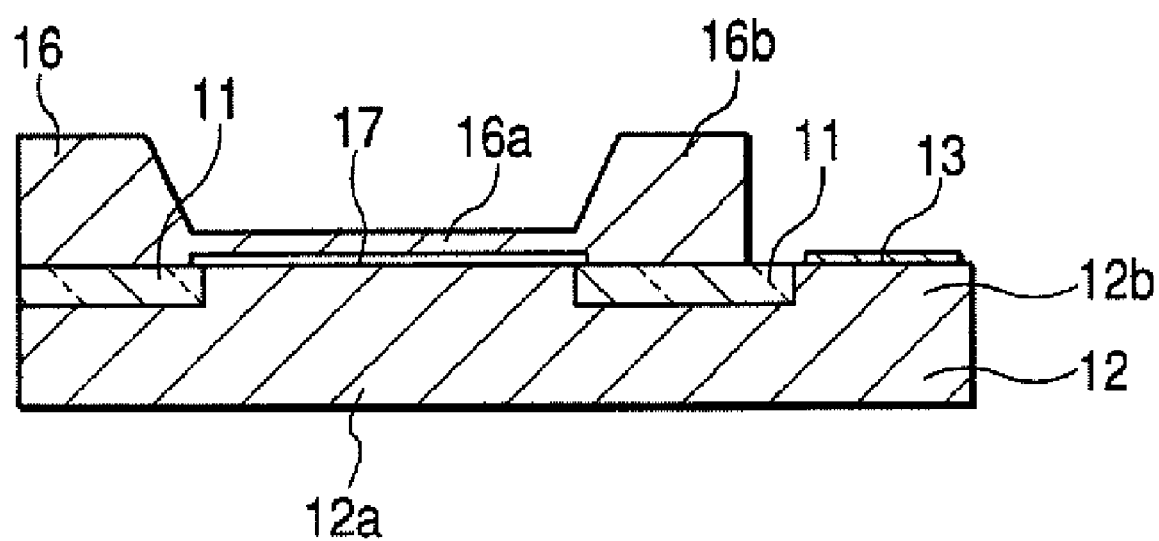
FIG. 4 is a cross-sectional view showing another example of a capacitive pressure sensor.
Figure 5:
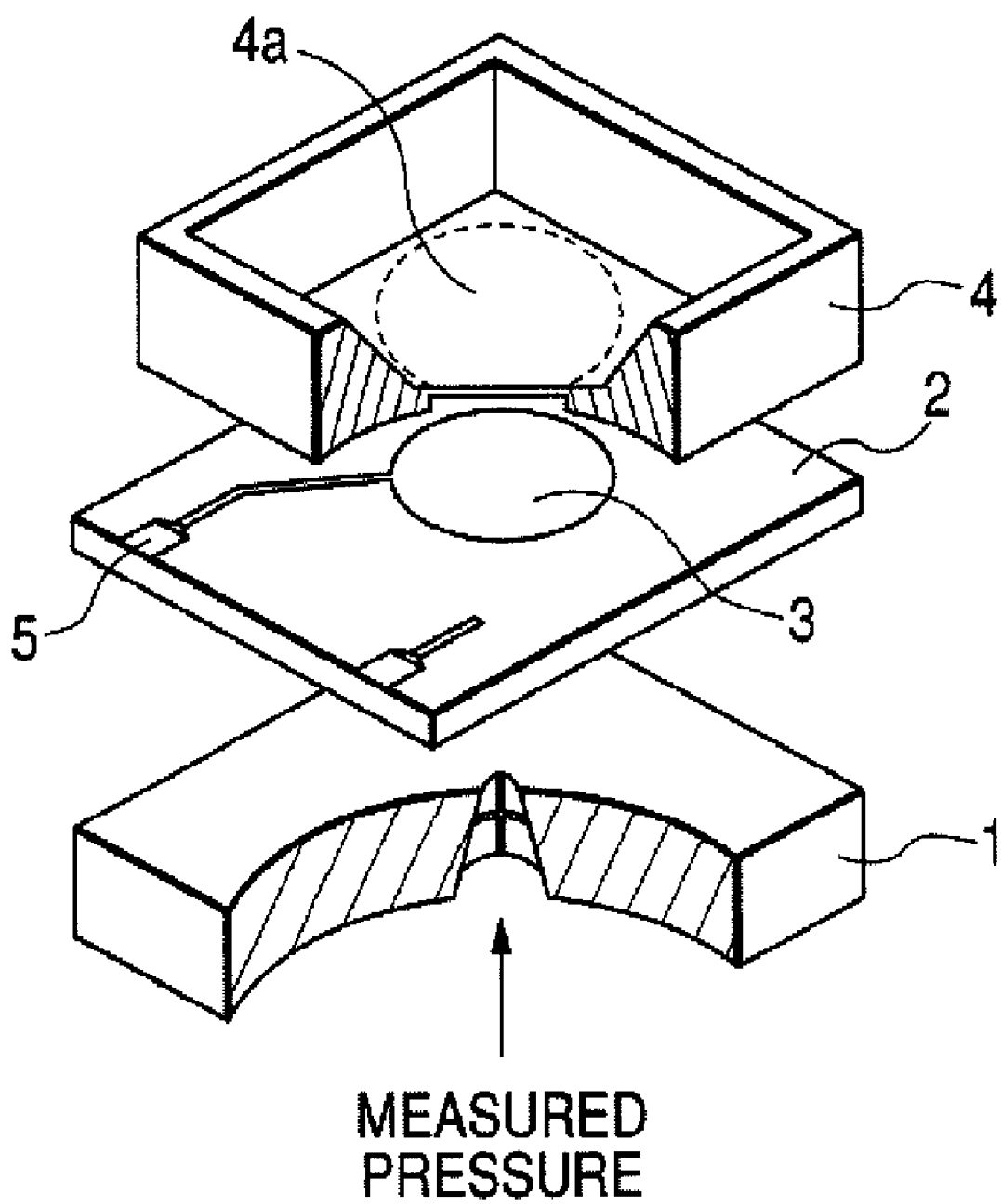
FIG. 5 is a cross-sectional view showing a known capacitive pressure sensor.

The invention is not limited to the above-described embodiment, but, on the contrary, is intended to cover various modifications. The concave portion 11c for the cavity 15 is disposed at the main surface 11a of the glass substrate 11 in the above-described embodiment, but the invention is not limited this configuration. As shown in FIG. 4, the concave portion for the cavity 17 can be disposed at the silicon substrate 16. With this configuration, it is possible to obtain the same effect as that of the above-described embodiment by disposing the fixed electrode 12a and the projection 12b in the first silicon substrate 12. In case of manufacturing the capacitive pressure sensor having the configuration of FIG. 4, a pressure-sensitive diaphragm 16a and a thick portion 16b are formed by etching both surfaces of a silicon substrate 16 by the same method as that described above. Meanwhile, the silicon substrate 16 is bonded onto the glass substrate 11 having the structure of FIG. 2C.

Dimensions and materials described in the embodiment are not limited. The processes described in the embodiment are not limited, and the sequence of the processes can be appropriately changed. Besides, the described embodiments may be modified in various different ways, all without departing from the spirit or scope of the present embodiments.

Various embodiments described herein can be used alone or in combination with one another. The forgoing detailed description has described only a few of the many possible implementations of the present invention. For this reason, this detailed description is intended by way of illustration, and not by way of limitation. It is only the following claims, including all equivalents that are intended to define the scope of this invention.

The invention claimed is:

1. A capacitive pressure sensor comprising:

a glass substrate that has a pair of surfaces facing each other;

a first silicon substrate that has a fixed electrode passing through the glass substrate to be exposed at one surface and a projection passing through the glass substrate to be exposed at the one surface;

a second silicon substrate that is bonded to the one surface of the glass substrate and has a movable electrode disposed to face the fixed electrode so as to form a cavity between the movable electrode and the fixed electrode; and a lead electrode for the fixed electrode, which is formed on the projection, wherein the projection is located outside the fixed electrode on the first silicon substrate, and the glass substrate is disposed in a groove that is formed by the fixed electrode and the projection, and wherein a recess of the glass substrate, that forms the cavity, is recessed from the fixed electrode at the outside of the fixed electrode.

2. The capacitive pressure sensor according to claim 1, wherein interfaces between the glass substrate and the first and second silicon substrates have Si—Si bonding or Si—O bonding.

3. The capacitive pressure sensor according to claim 1, wherein a separate member is not interposed between the fixed electrode and the projection.

4. The capacitive pressure sensor according to claim 1, wherein the lead electrode does not exist in the bonded region between the glass substrate and the second silicon substrate.

* * * * *